United States Patent
Johnson et al.

(10) Patent No.: US 10,793,357 B2
(45) Date of Patent: Oct. 6, 2020

(54) ROBOT DWELL TIME MINIMIZATION IN WAREHOUSE ORDER FULFILLMENT OPERATIONS

(71) Applicant: Locus Robotics Corp., Wilmington, MA (US)

(72) Inventors: Michael Charles Johnson, Ashland, MA (US); Sean Johnson, Danvers, MA (US)

(*) Notice: Subject to any disclaimer, the term of this patent is extended or adjusted under 35 U.S.C. 154(b) by 47 days.

(21) Appl. No.: 16/262,209

(22) Filed: Jan. 30, 2019

(65) Prior Publication Data

US 2020/0239231 A1  Jul. 30, 2020

(51) Int. Cl.
- *B65G 1/137* (2006.01)
- *G06Q 10/08* (2012.01)
- *G05D 1/02* (2020.01)
- *B25J 9/16* (2006.01)

(52) U.S. Cl.
CPC .......... *B65G 1/1373* (2013.01); *B25J 9/1679* (2013.01); *G05D 1/0291* (2013.01); *G06Q 10/08* (2013.01); *G05D 2201/0216* (2013.01)

(58) Field of Classification Search
CPC .... B65G 1/1373; G06Q 10/08; G05D 1/0291; G05D 2201/0216; B25J 9/1679
USPC ......................................................... 700/216
See application file for complete search history.

(56) References Cited

U.S. PATENT DOCUMENTS

| | | | | |
|---|---|---|---|---|
| 9,776,324 B1* | 10/2017 | Johnson | ................ | B25J 9/1666 |
| 10,022,867 B2* | 7/2018 | Saboo | ................... | B25J 9/1661 |
| 10,296,995 B2* | 5/2019 | Saboo | ..................... | B25J 5/007 |
| 10,414,052 B2* | 9/2019 | Deyle | ................ | G08B 13/2491 |
| 10,513,033 B2* | 12/2019 | Johnson | ................ | B25J 9/1666 |
| 2012/0152877 A1* | 6/2012 | Tadayon | .................... | B25J 5/00 212/224 |
| 2015/0360865 A1* | 12/2015 | Massey | ................. | B25J 9/0003 414/275 |
| 2015/0367513 A1* | 12/2015 | Gettings | ............... | B25J 9/0084 700/248 |
| 2017/0285648 A1* | 10/2017 | Welty | ..................... | B25J 5/007 |

(Continued)

FOREIGN PATENT DOCUMENTS

WO  2018/132793 A1  7/2018

OTHER PUBLICATIONS

International Search Report with Written Opinion, dated Apr. 1, 2020, received in international patent application No. PCT/US2020/015811, 10 pages.

*Primary Examiner* — Michael Collins
(74) *Attorney, Agent, or Firm* — Verrill Dana, LLP; John W. Powell

(57) ABSTRACT

A method for executing an order with a plurality of items assigned to a first robot of a plurality of robots operating in a warehouse with the assistance of a plurality of operators. The method includes navigating the first robot to a first location in the warehouse proximate a location of a first item in the order and pausing for an operator of to assist the first robot to execute a function. The method includes determining if the first robot has been paused for greater than a maximum dwell time without being assisted by an operator. If it has been, the method causes the first robot to leave the first location without completing the function on the first item and causing the first robot to proceed to a second location proximate a storage a second item to execute a function.

18 Claims, 12 Drawing Sheets

(56) References Cited

U.S. PATENT DOCUMENTS

2017/0286916 A1* 10/2017 Skiba .................... H04L 67/42
2018/0201444 A1    7/2018 Welty et al.

* cited by examiner

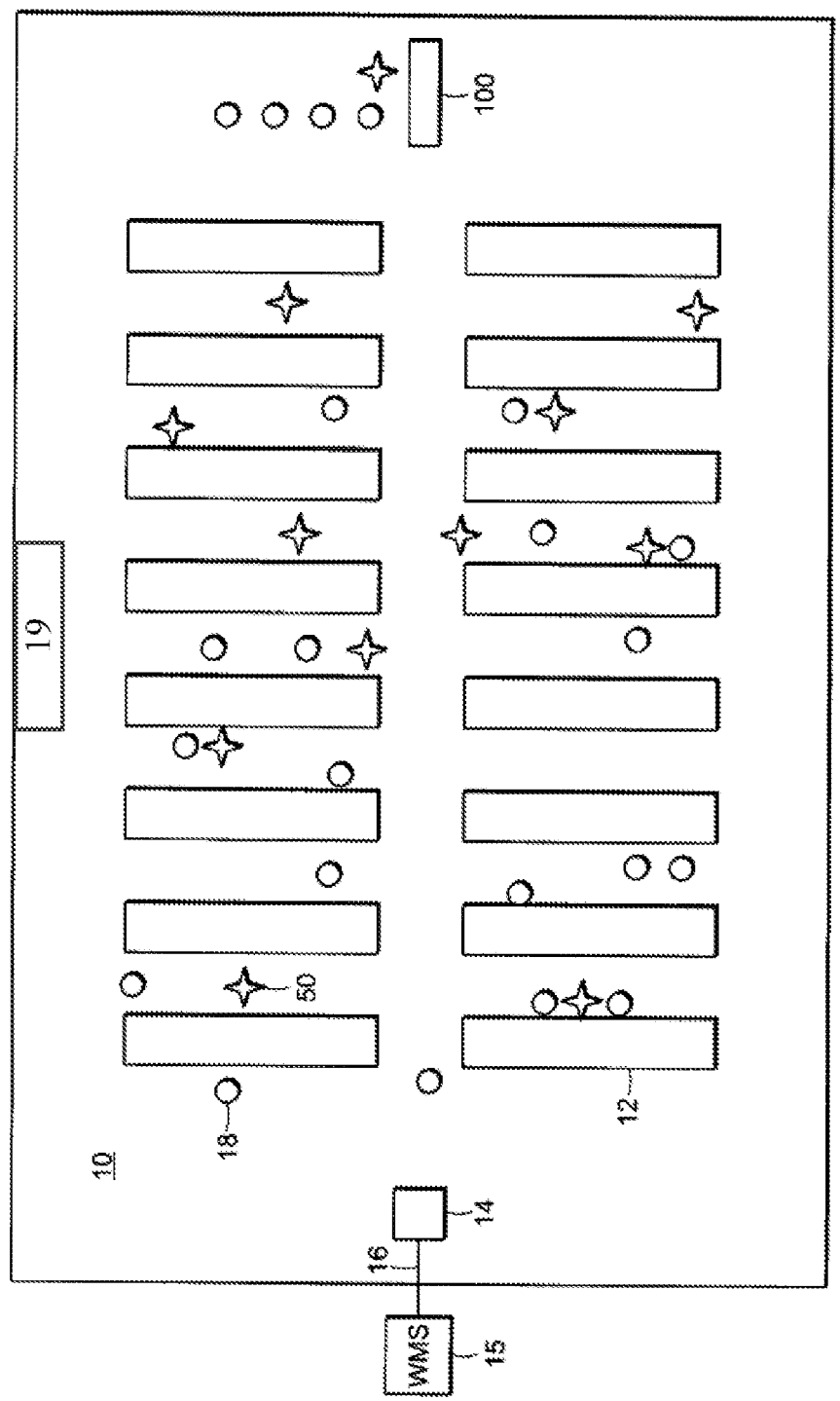

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| | Location | Fiducial ID |
|---|---|---|
| 400 | | ← 404 |
| 402a | L01001A | 11 |
| 402b | L01001B | 11 |
| 402c | L01001C | 11 |
| 402d | L01001D | 11 |
| 402e | L01001E | 11 |
| 402f | L01001F | 11 |
| | L01002A | 12 |
| | L01002B | 12 |
| | L01002C | 12 |
| | L01002D | 12 |
| | L01002E | 12 |
| | L01003A | 13 |
| | L01003B | 13 |
| | L01003C | 13 |
| | L01003D | 13 |
| | L01003E | 13 |
| | L01003F | 13 |
| | L01004A | 14 |
| | L01004B | 14 |
| | L01004C | 14 |
| | L01004D | 14 |
| | L01004E | 14 |
| | L01005A | 15 |
| | L01005B | 15 |
| | L01005C | 15 |
| | L01005D | 15 |
| | L01005E | 15 |
| | L01005F | 15 |

ROBOT DWELL TIME MINIMIZATION IN WAREHOUSE ORDER FULFILLMENT OPERATIONS

FIELD OF THE INVENTION

This invention relates to use of autonomous mobile robots in warehouse order fulfillment operations and more specifically to minimizing dwell time of such autonomous mobile robots.

BACKGROUND OF THE INVENTION

Order fulfillment is typically performed in a large warehouse filled with products to be shipped to customers who have placed their orders over the internet for home delivery. In some operations, robots may be used to assist humans in item retrieval in order to increase productivity and efficiency. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

A warehouse management system (WMS) is a software application that supports the day-to-day operations in an order fulfillment warehouse like the one described above. WMS programs enable centralized management of tasks, such as tracking inventory levels and stock locations. Warehouse management systems also support or direct all of the major and many minor warehouse tasks such as receiving, inspection and acceptance, put-away, internal replenishment to picking positions, picking, packing, order assembly on the shipping dock, documentation, and shipping (loading onto carrier vehicles).

The WMS typically receives orders from the overlying host system, usually an ERP system. For order fulfillment via E-Commerce orders, as soon as a customer places an order online, the information is passed along via the host computer/ERP system to the WMS. All necessary steps to manage the order (e.g. pick the ordered items etc.) are then processed within the WMS. Afterwards, information is sent back to the ERP system to support financial transactions, advance shipping notifications to customers, inventory management, etc.

As the orders from the WMS accrue they are held in an order queue in the WMS or order data from the WMS may be provided to a separate software system (e.g. an order server) wherein an order queue may be established and the orders assigned to robots for execution within the warehouse. Each order will include one or more item(s) located in the warehouse. The robot will navigate to the locations of the various items in the assigned order and at each location a human operator may assist the robot in executing the task of physically removing an item from a shelf and placing it on robot, for example, in a tote.

Once the robot arrives at the location of an item in its order, it may communicate, e.g. via light signaling, that it is in need of assistance by an operator. Once an operator arrives at the robot, the robot may communicate information about the item to be selected by the operator via a tablet (or laptop/other user input/output device), which the operator can read, or by transmitting the order to a handheld device used by the local operator. The operator will then retrieve the item, scan the items barcode and then place the item on the robot. Then the robot may then make its way to another location to pick up its next item in the order.

In the event that there are limited number of human operators in an area or there are a number of robots needing service, there may be a delay in an operator approaching the robot to assist it. This delay, may be longer than is desirable and when multiplied across many robots and over longer periods of time this may have an undesirable effect on overall warehouse efficiency.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, the invention includes a method for executing an order assigned to a first robot of a plurality of robots operating in a warehouse. The plurality of robots interact with a warehouse management system to execute orders with the assistance of a plurality of operators, each order including a plurality of items and each item being located in the warehouse. The method includes navigating the first robot to a first location in the warehouse proximate a storage location of a first item of the plurality of items in the order and pausing at the first location for an operator of the plurality of operators to assist the first robot execute a function with respect to the first item. The method also includes determining if the first robot has been paused at the first location for greater than a maximum dwell time without being assisted by an operator. If the first robot has been paused at the first location for greater than the maximum dwell time, the method includes causing the first robot to leave the first location without completing the function with respect to the first item and causing the first robot to proceed to a second location in the warehouse proximate a storage location of a second item of the plurality of items in the order to execute a function with respect to the second item.

In other aspects of the invention, one or more of the following features may be included. The method of claim 1 wherein the function includes one of a pick, place or maintenance function. The step of causing may include assessing one or more of robot, operator, or active location population proximate each item in the order. The step of assessing robot, operator, or active location population may include determining one or more of the number of robots, operators, or active locations in a region about each item in the order. The step of assessing robot, operator, or active location population may include determining an operator to robot ratio in the region about each item in the order. The step of causing may include selecting the second item as the item having a region with one or more of the highest robot, operator, or active location population or operator to robot ratio in the region about each item in the order. The method may further include pausing the first robot at the second location for an operator of the plurality of operators to assist the first robot execute a function with respect to the second item. Subsequent to the first robot executing a function at the second location with respect to the second item, the first robot may return to the first location in the warehouse proximate the storage location of a first item of the plurality of items in the order to execute a function at the first location with respect to the first item. The first robot, prior to returning to the first location, may navigate to at least one additional location to execute a function with respect to an additional item in the order.

In another aspect, the invention features a system for executing orders each order including a plurality of items being located in a warehouse. The system includes a plurality of robots operating in the warehouse, including a first robot to which an order is assigned. There is A warehouse management system configured to interact with the plurality of robots to execute orders with the assistance of a plurality of operators and a first robot of the plurality of robots configured to receive from the warehouse management system a first order having a plurality of items and to navigate to a first location in the warehouse proximate a storage location of a first item of the plurality of items in the order. The first robot is configured to determine if it has been paused at the first location for greater than a maximum dwell time without being assisted by an operator to execute a function with respect to the first item. If the first robot has been paused at the first location for greater than the maximum dwell time, the first robot is configured to leave the first location without completing the function with respect to the first item and to interact with the warehouse management system to identify a second item of the plurality of items in the order. The first robot is configured to proceed to a second location in the warehouse proximate a storage location of the second item in the order to execute a function with respect to the second item with the assistance of an operator.

In yet further aspects of the invention, one or more of the following features may be included. The function may include one of a pick, place or maintenance function. In identifying a second item of the plurality of items in the order, the warehouse management may be configured to assess one or more of robot, operator, or active location population proximate each item in the order. In assessing the robot, operator, or active location population, the warehouse management system may be configured to determine one or more of the number of robots, operators, or active locations in a region about each item in the order. In assessing one or more of robot, operator, or active location population, the warehouse management system may be configured to determine an operator to robot ratio in the region about each item in the order. In identifying the second item of the plurality of items in the order, the warehouse management system may be configured to select the second item as the item having a region with one or more of the highest robot, operator, or active location population or operator to robot ratio in the region about each item in the order. The first robot may be configured to pause at the second location for an operator of the plurality of operators to assist the first robot execute a function with respect to the second item. Subsequent to the first robot executing a function at the second location with respect to the second item, the first robot may be configured to return to the first location in the warehouse proximate the storage location of a first item of the plurality of items in the order to execute a function at the first location with respect to the first item. The first robot, prior to returning to the first location, may be configured to navigate to at least one additional location to execute a function with respect to an additional item in the order.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 1 is a top plan view of an order-fulfillment warehouse;

FIG. 6 is a table of the fiducial identification to pose mapping;

FIG. 7 is a table of the bin location to fiducial identification mapping;

DETAILED DESCRIPTION OF INVENTION

Figure 2A:
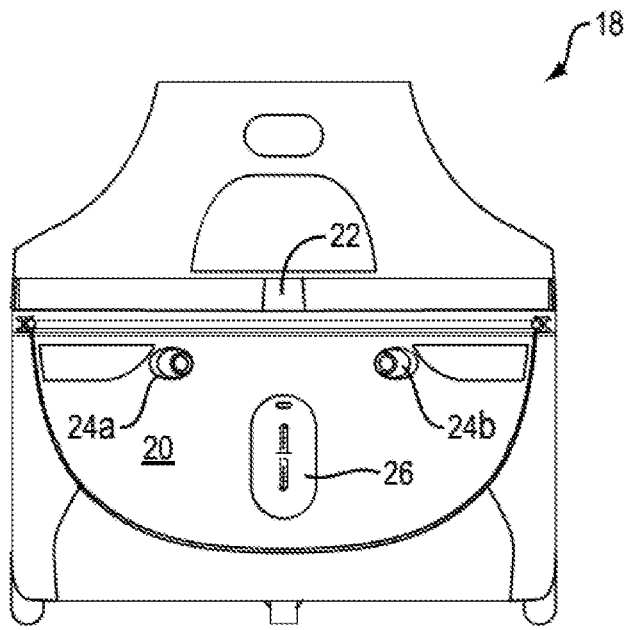
FIG. 2A is a front elevational view of a base of one of the robots used in the warehouse shown in FIG. 1.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to a dwell minimization approach which may be applied to an order fulfillment operation in a warehouse using autonomous mobile robots or "AMRs" in order to increase efficiency and productivity. A specific AMR implementation is described herein, but it is only to provide context for the dwell minimization approach according to this invention. Any applicable robot design/system may be used in conjunction with the induction process described herein. Moreover, the implementation described herein is focused on the AMRs executing the pick function; however, the dwell minimization approach described herein is applicable to any function the robots may be executing, including but not limited to placing items and performing maintenance functions on the items.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18, e.g. wirelessly, for execution. The induction process according to an aspect of this invention will be described in more detail below.

It will be understood by those skilled in the art that order server 14 may be a separate server with a discrete software system configured to interoperate with the WMS server 15 and WMS software or the order server functionality may be integrated into the WMS software and run on the WMS server 15.

Figure 2B:
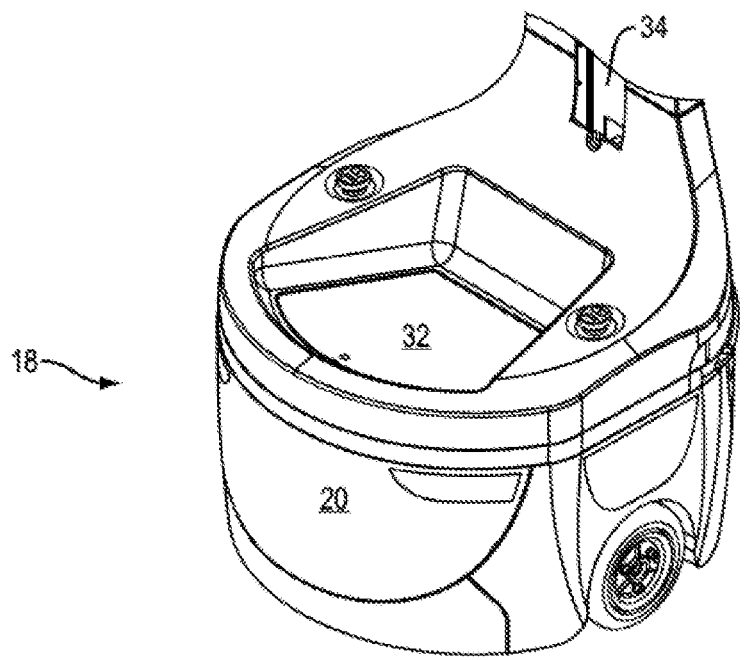
FIG. 2B is a perspective view of a base of one of the robots used in the warehouse shown in FIG. 1.
Figure 3:
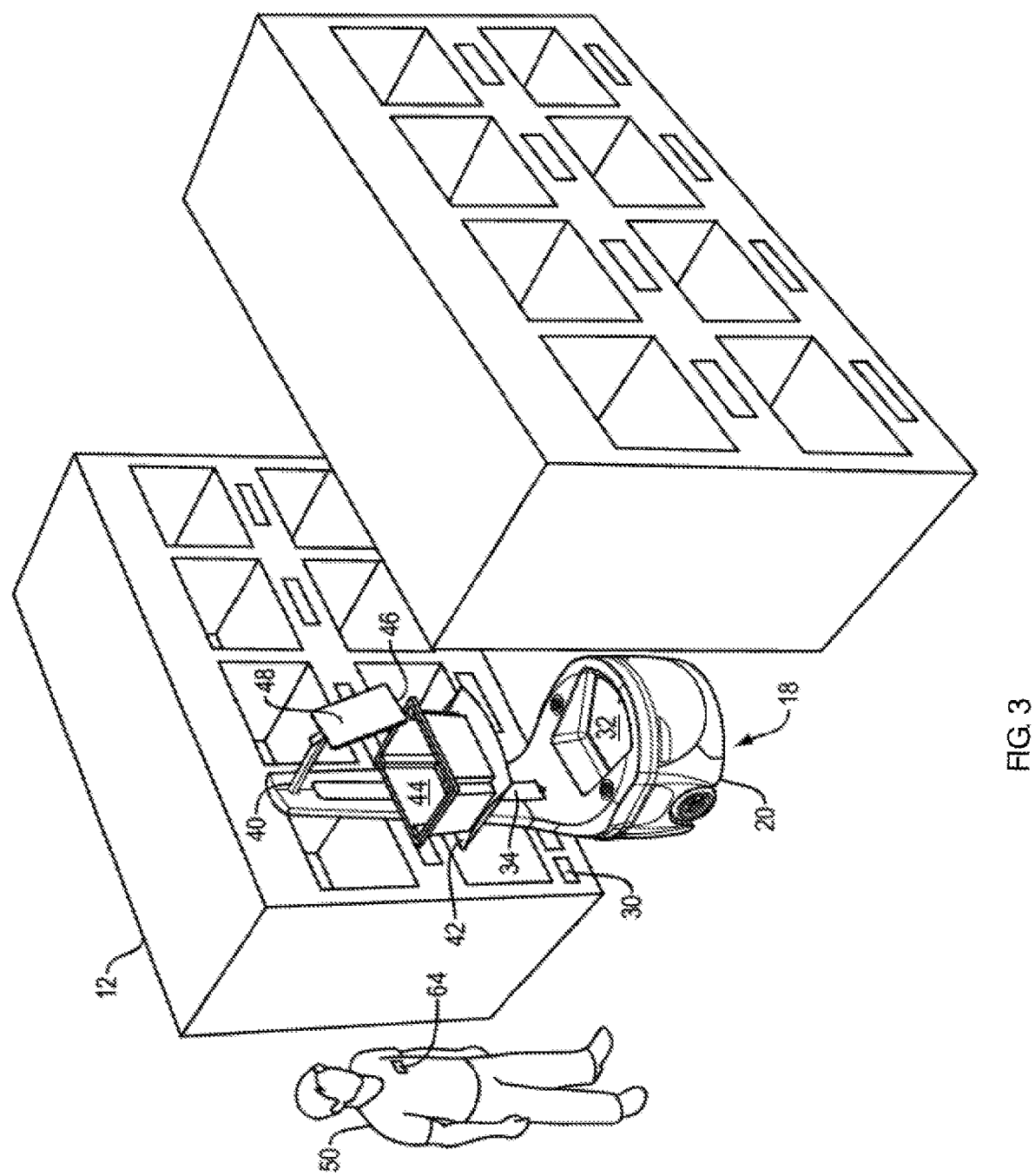
FIG. 3 is a perspective view of the robot in FIGS. 2A and 2B outfitted with an armature and parked in front of a shelf shown in FIG. 1.
Figure 4:
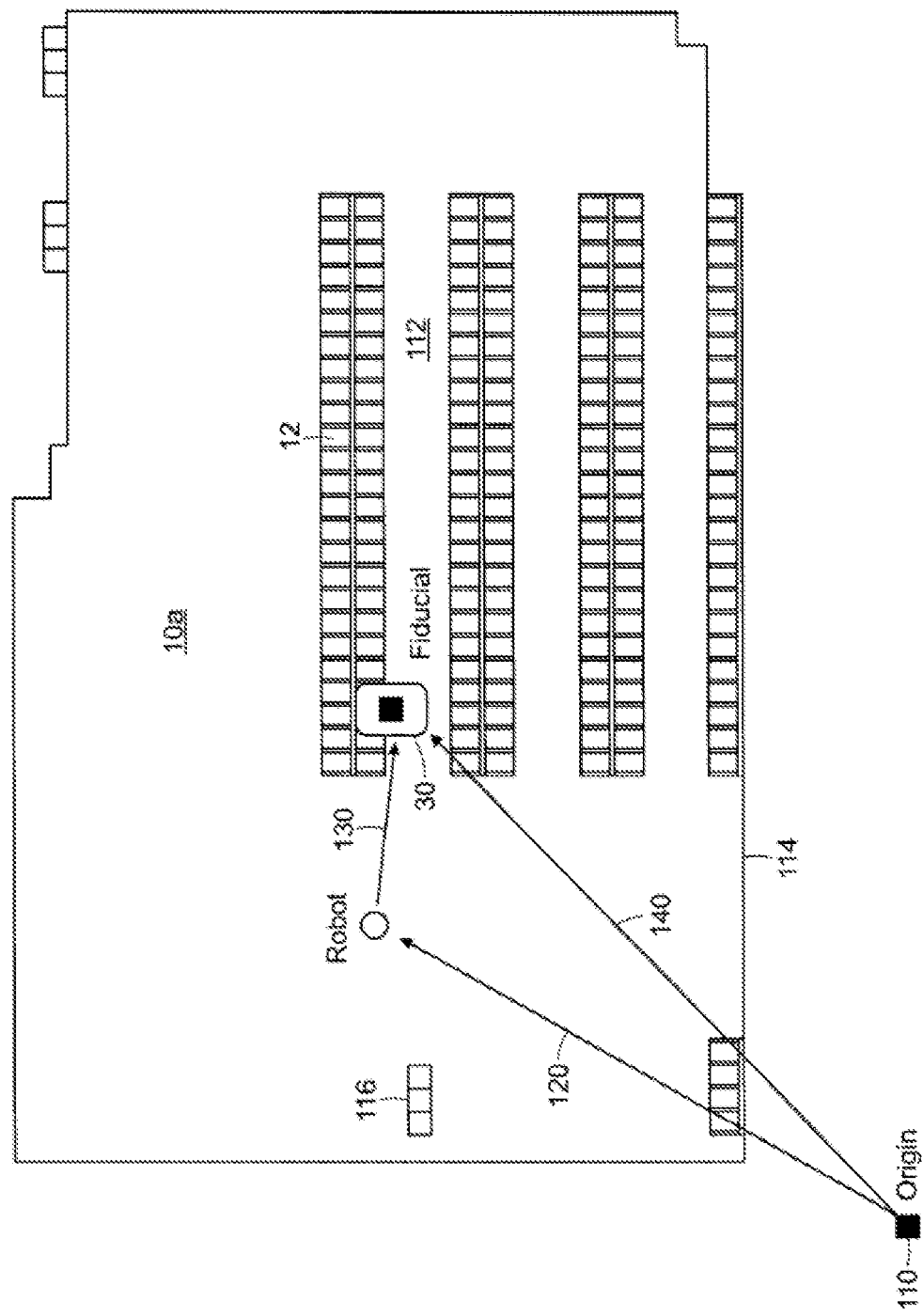
FIG. 4 is a partial map of the warehouse of FIG. 1 created using laser radar on the robot.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

Fiducial markers are also used to identify processing stations (including induction stations) and the navigation to such processing station fiducial markers may be the same as the navigation to the bin/location of items ordered. It should be noted that the navigation approach described herein is only exemplary and any other applicable navigation approach may be used.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not adept enough to quickly and efficiently pick items from a shelf and place them in the tote 44. Currently, a more efficient way of picking items is to use a local operator 50, which is typically human, to carry out the task of physically removing an ordered item from a shelf 12 and placing it on robot 18, for example, in tote 44. The robot 18 communicates the order (i.e. the individual item(s) to select) to the local operator 50 via the tablet 48 (or laptop/other user input/output device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored, communicates the item information to the local operator 50, and waits (or dwells) for a local operator 50 to retrieve the item from the shelf 12 and place it in tote 44. If robot 18 has other items to retrieve, it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. It should be noted that this is an exemplary navigation approached described herein and that any suitable navigation approach may be used in conjunction with the induction process described herein.

Using one or more robots 18, a map of the warehouse 10 must be created and dynamically updated to determine the location of objects, both static and dynamic, as well as the locations of various fiducial markers dispersed throughout the warehouse. One or more of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS.

3 and 4, is located by robot 18 using its cameras 24*a* and 24*b*, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose, which comprises its position (x, y, z coordinates) in the warehouse along with its orientation or quaternion (x, y, z, w) for fiducial marker 30 can be determined. It should be noted that the coordinates may only include x and y coordinates as the fiducial pose is typically located on the floor and thus the z coordinate is zero.

Figure 5:
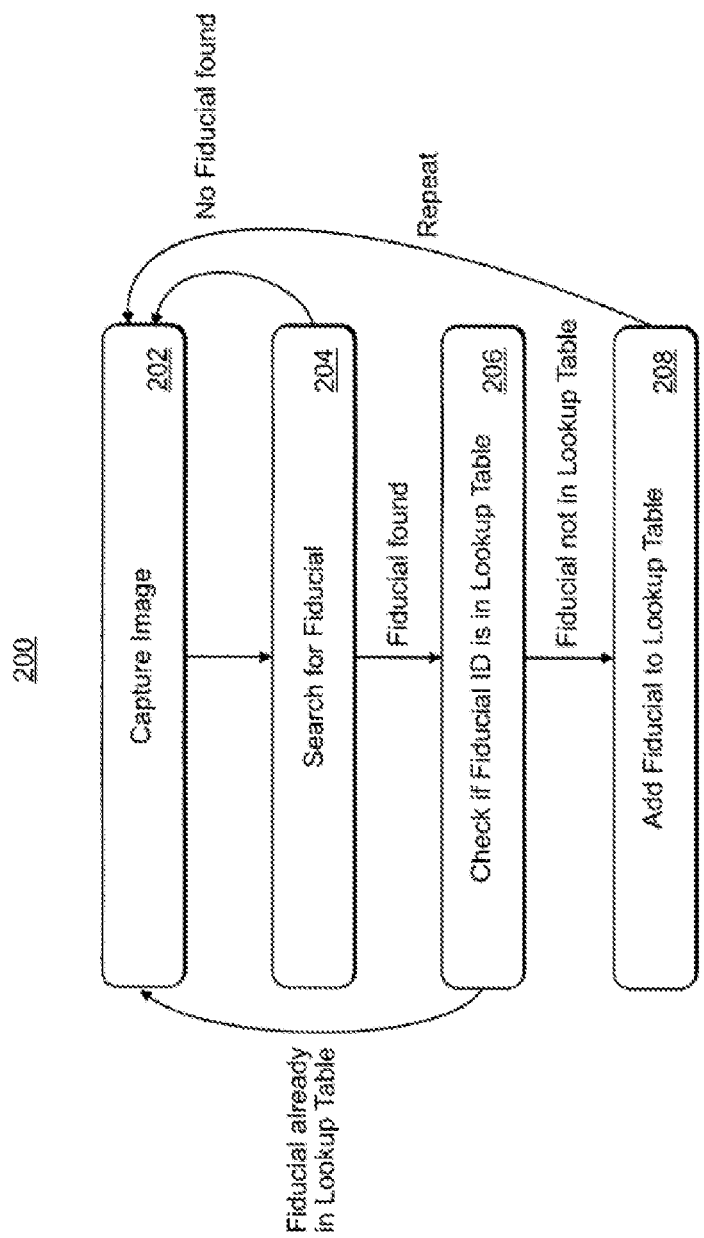
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24*a* and 24*b* captures an image and in step 204 searches for fiducial markers within the captured images. In step 206, if a fiducial marker is found in the image (step 204) it is determined if the fiducial marker is already stored in fiducial table 300, FIG. 6, which may be located in memory 34 of robot 18 and/or in the warehouse management system 15. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot and/or in the warehouse management system 15, there are included for each fiducial marker, a fiducial identification, 1, 2, 3, etc., and a pose for the fiducial marker/bar code associated with each fiducial identification. As indicated above, the pose consists of the x,y,z coordinates in the warehouse along with the orientation or the quaternion (x,y,z,ω).

In another look-up Table 400, FIG. 7, which may also be stored in the memory of each robot and/or in the warehouse management system 15, is a listing of bin locations (e.g. 402*a*-*f*) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19 and processing station 100, FIG. 1, may also be stored in table 400 and correlated to fiducial IDs. From the fiducial IDs, the poses of the charging station and processing station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
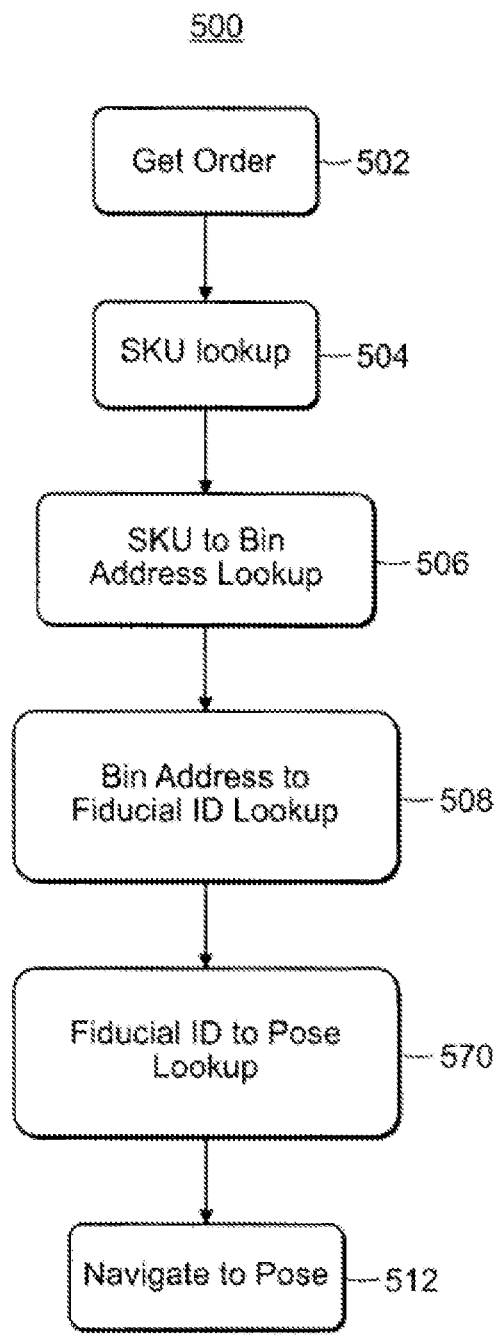
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10*a* is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3SRM search space according to methods disclosed in related U.S. application Ser. No. 15/712,222, entitled Multi-Resolution Scan Matching with Exclusion Zones, filed on Sep. 22, 2017 and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker. ORCA optimally avoids collisions with other moving robots without requiring communication with the other robot(s).

Navigation proceeds as a series of incremental movements along trajectories computed at the approximately 50 ms update intervals. Collision avoidance may be further improved by techniques described in related U.S. application Ser. No. 15/712,256, entitled Dynamic Window Approach Using Optimal Reciprocal Collision Avoidance Cost-Critic, filed on Sep. 22, 2017 and incorporated by reference in its entirety herein.

Figure 9:
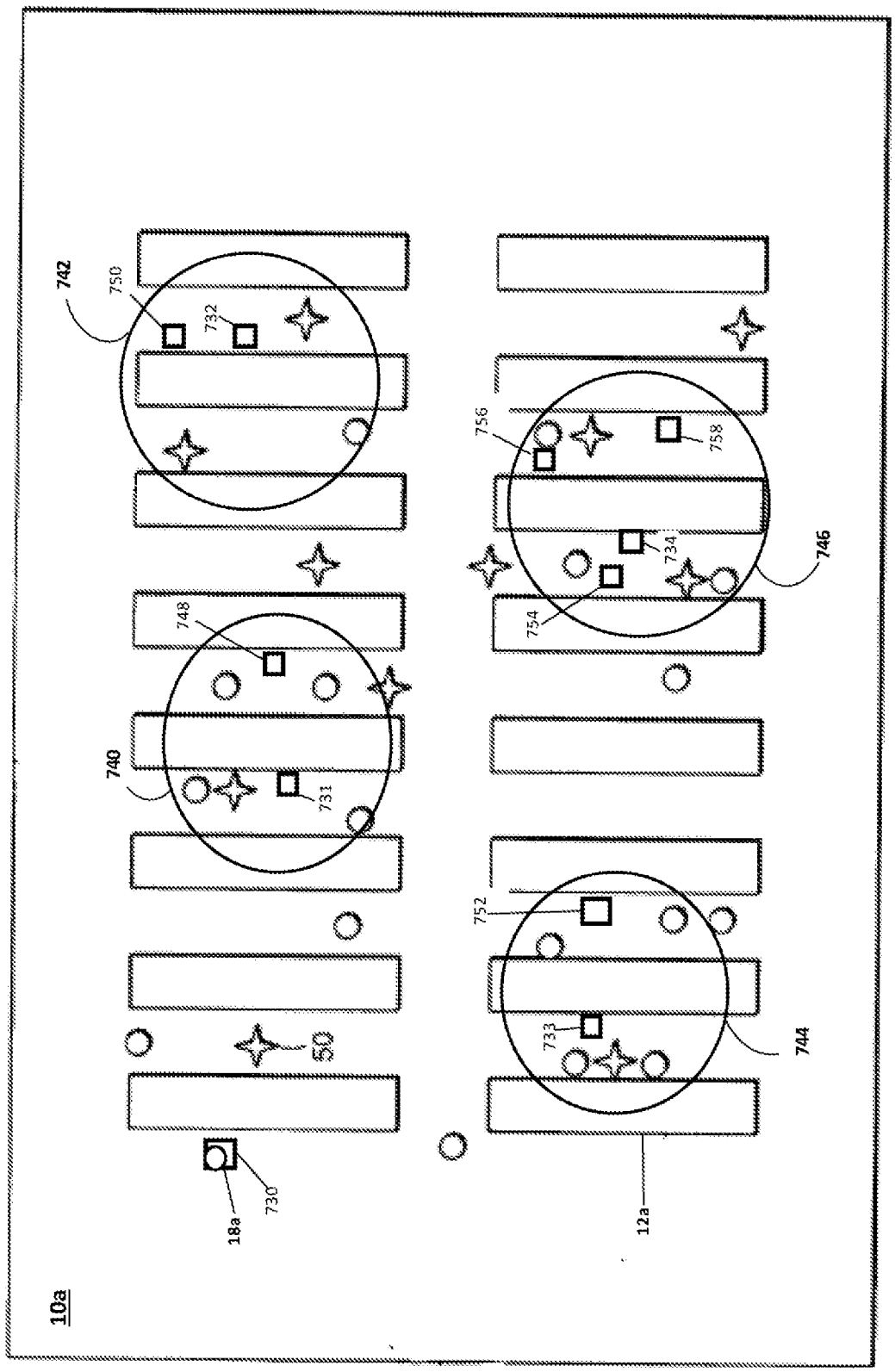
FIG. 9 is a top plan view of a portion of an order-fulfillment warehouse depicting the locations of robots and operators deployed in the warehouse.

Referring to FIG. 9, a portion of a typical order-fulfillment warehouse 10a includes shelves, e.g. shelf 12a, filled with the various items that could be included in an order and a plurality of robots, e.g. 18a, deployed in the warehouse to execute pick orders (or place/maintenance orders). Also shown are a number of operators, e.g. 50a, dispersed throughout the warehouse to service robots in picking items from the shelves. There may be situations when there are a limited number of human operators in an area where robots are in need of servicing or there may be a reasonable number of operators in a given area but a high number of robots needing service. In either case, robots may experience delays in being assisted by an operator. Such delays may be longer than desirable and when multiplied across many robots and over longer periods of time this may have an undesirable effect on overall warehouse efficiency.

A method according to an aspect of this invention to reduce the delays or "dwell times" a robot experiences while waiting to be serviced by an operator is described. Once the robot arrives at the location of an item in its order, for example, robot 18a proximate item 730, it may communicate, e.g. via light signaling, that it is in need of assistance by an operator and the robot may determine the amount of time (dwell time) it takes from arrival to the location to servicing by an operator. Operator 50a, which is the nearest operator, is in the next aisle and may not initially know that robot 18a is in need of assistance. Moreover, there are other robots in the vicinity which also may need service which operator 50 may attend to before reaching robot 18a. As a result, robot 18a may dwell and sit idle for a period of time which is longer than desired, thereby operating inefficiently. A maximum dwell time, according to this invention, may be defined based on the particular implementation considering the number of robots and operators and the volume of orders being executed. A maximum dwell time may be set at between one and five minutes, for example. Longer or shorter dwell time settings may be used.

Continuing to refer to FIG. 9, instead of dwelling near item 730 until an operator arrives to service it, robot 18a, may instead process items of its assigned order in a different sequence than originally determined. In this example, the original sequence for robot 18a, which was determined after the order was assigned, was to pick items 730, 731, 732, 733, and 734 in sequence. It should be noted that the items are indicated by the poses of the fiducials which are associated with the items, as described above. Normally, robot 18a would simply wait near item 730 until an operator picked the item and loaded it in robot 18a. Robot 18a may then proceed to the other items in its order in sequence until all items are picked, at which point it would then proceed to a packing station so the items can be packed and shipped. It should be noted that determining the sequence of picking items in the order is beyond the scope of this invention and is therefore not described herein.

According to this invention, if the maximum dwell time is exceeded at a location, such as at the location for item 730, the remaining items in the order may be evaluated and robot 18a may be instructed to move on from item 730 and proceed out of sequence to another item in the order. The robot may then continue with the original sequence after it has skipped item 730 and processed the next item. It may then return to item 730 once the remaining items have been picked. Alternatively, after skipping item 730 and proceeding to another item in the order, the remaining items may be re-evaluated and a new sequence may be defined by any desired process In determining the next item to proceed to when an item is skipped, the robot and/or operator population in an area about each other item in the order may be considered/assessed in order to determine which region is likely to service robot 18a the quickest. This may be done in various ways, including selecting the item in a region with highest robot/operator density (number of robots and/or operators over the area of the region around the item) or with the highest operator to robot ratio or a combination of both. A region may be defined about each additional item in the current order/order set, such as region 740 about item 731, region 742 about item 732, region 744 about item 733, and region 746 about item 734. The regions may be established by selecting a radius and projecting a circle about each item of the selected radius. The radius may vary by implementation, but as an example the radius may be ten meters. From the area of the region and the number of robots/operators in the region robot/operator density may be calculated As can be seen in FIG. 9, in region 740 about item 732 there are four robots and two operators for a total population of six. In region 742 about item 733 there are one robot and two operators for a total population of three and in region 744 about item 733 there are four robots and one operator. Finally, in region 746 about item 734 there are three robots and two operators for a total population of five. The operator to robot ratio in each region is as follows: 2:4 in region 740; 2:1 in region 742; 1:4 in region 744; and 2:3 in region 746. The next item to proceed to may be based on the highest robot/operator population density, which in this example, would result in two regions 740 and 746, each with a total population of six in their respective fixed size regions. Or, the next item may be based on the operator to robot ratio, as the region with the higher number of operators compared to robots would likely result in a lower dwell time. In this case, region 746, having a 2:3 ratio as compared to the 2:4 ratio of region 740, may be selected and item 734 may be identified as the next item to proceed to for a pick operation.

In some cases, the locations of items in the warehouse which have been assigned to robots other than robot 18a, but the items have not yet been picked ("active locations") may be identified. For example, the map of FIG. 9 may include indicators at such active locations and this may be used instead of or in addition to operator/robot population/density in a region in order to select the next item/location to send the robot. Active locations are depicted as follows. In region 740 about item 732 there one active location 748. In region 742 about item 733 there is one active location 750. In region 744 about item 733 there is one active location 752. Finally, in region 746 about item 734 there are three active locations 754, 756, and 758. If the next item were to be selected on active locations instead of robots or operators, region 746 about item 734 would still be selected. It should be noted that the poses for active locations are the locations associated with the fiducial marker/two-dimensional barcode corresponding to the items assigned to be picked, as described above.

Assuming, that there are no further dwell time issues with the other items in this order, the new pick sequence would be item 734, item 731, item 732, item 733, and finally robot 18a would return to skipped item 730. Of course, other sequences after item 734 has been picked are possible. For example, robot 18a may return to item 730 after picking item 734 and then proceed in order for items 731-733.

Alternatively, the new sequence may be based on the population density and ratios established above. In that case, the sequence may be item 734, item 731 (population density six, ratio 2:4), item 733 (population density five, ratio 1:4), item 732 (population density three, ratio 2:1).

Figure 10:
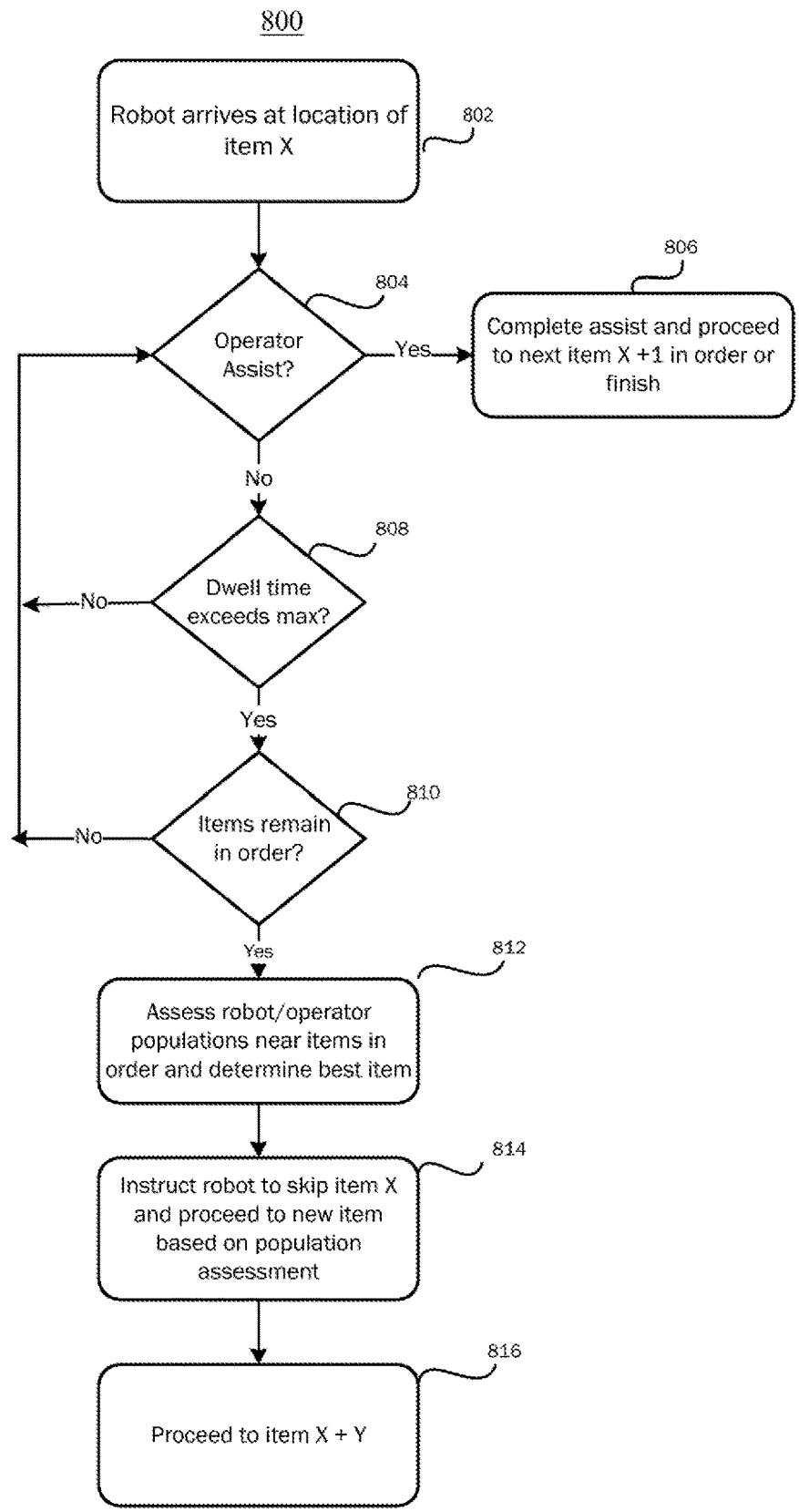
FIG. 10 is a flow chart depicting an algorithm for minimizing robot dwell time according to an aspect of this invention.

A flow chart 800, FIG. 10, depicts an algorithm for implementing in software/firmware the dwell time minimization process according to an aspect of this invention. The software/firmware may run at the WMS level or on robot 18a or a combination of both. As indicated above, when a robot is inducted and assigned an order, a sequence for picking the items in the order is established and the robot embarks to fulfill the order by proceeding to each item in sequence. At step 802, robot 18a is shown to arrive at the location (pose) of an item in the order, item X, which may be the first or any other item in the order.

At step 804 it is determined if the robot 18a is being assisted by an operator and if it is being assisted, the system proceeds to step 806 where the robot completes the pick function with the assistance of the operator and then proceeds to the next item, X+1, in the sequence. If at step 804 it is determined that robot 18a is not yet being assisted by an operator, at step 808 it is determined if a predetermined maximum dwell time has been exceeded while waiting for an operator to assist. If the dwell time has not been exceeded, the system, reverts to step 804 to check again if there is an operator assisting the robot.

If at step 808 it is determined that the maximum dwell time has been exceed, at step 810, it is determined if there are additional items in the order to be picked and if there are no additional items, the system reverts to step 804 to determine if an operator has assisted the robot. With no items remaining in the order, skipping the current item to service another item in the order is not possible so the loop continues until the robot is assisted by an operator and then at step 806, the robot finishes the order by navigating to a packing station.

If there are additional items in the order, as determined at step 810, the system proceeds to assess robot/operator populations near the remaining items in the order at step 812, in the manner described above. At step 814, the robot is instructed to skip the current step and to proceed to the next item based on the population assessment of step 812. At step 816, the robot proceeds to the next item, X+Y, where Y is the number of items ahead in the sequence from the current item. This will likely result in less overall dwell time waiting for operator assistance.

Non-Limiting Computing Device Examples

Figure 11:
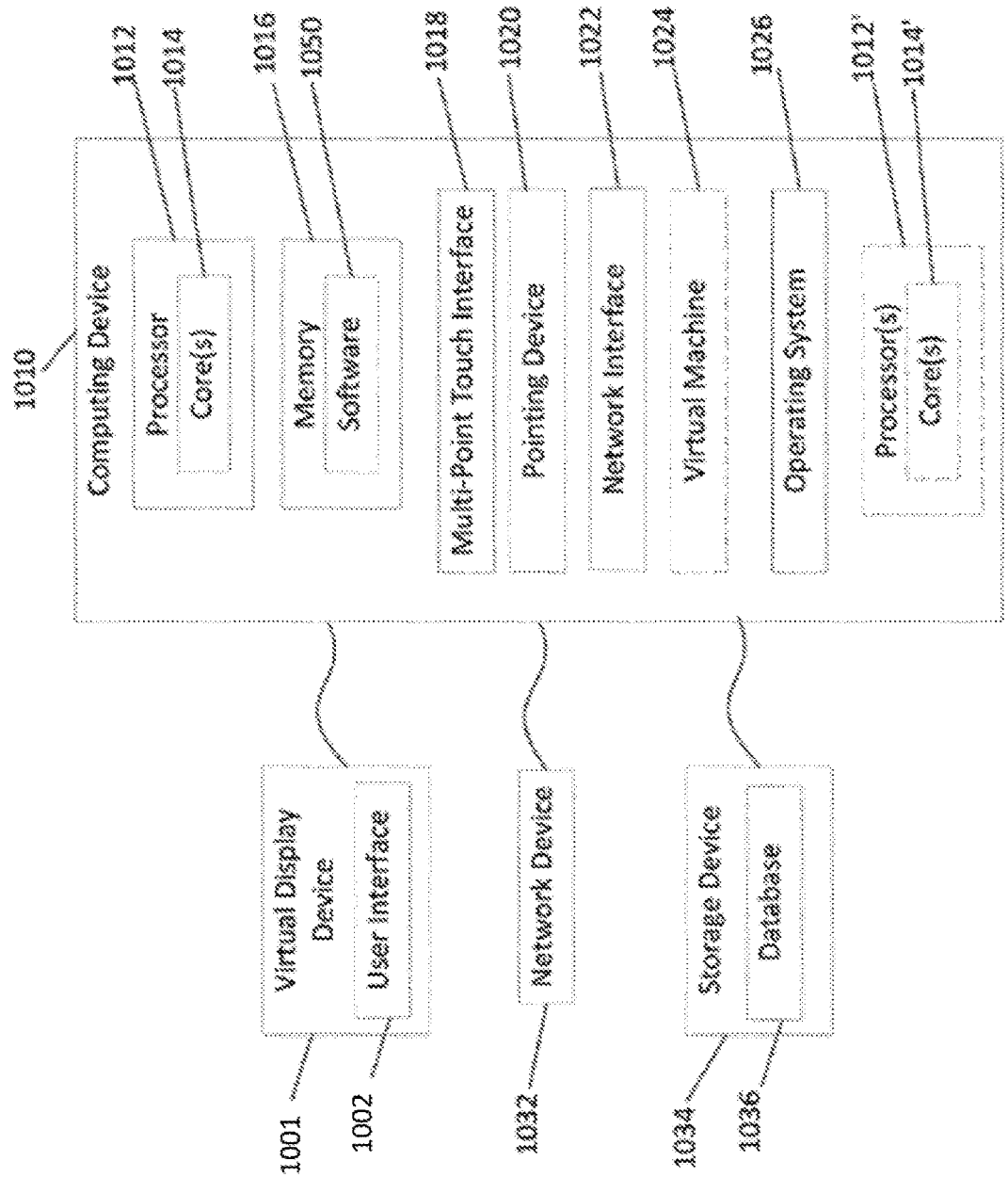
FIG. 11 is a block diagram of an exemplary computing system.

The above described systems and software for the robot and the WMS may be implemented various ways. In FIG. 11 is a block diagram of an exemplary computing device 1010 such as may be used, or portions thereof, in accordance with various embodiments as described above with reference to FIGS. 1-10. The computing device 1010 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1016 included in the computing device 1010 may store computer-readable and computer-executable instructions or software for performing the operations disclosed herein. For example, the memory may store software application 1040 which is programmed to perform various of the disclosed operations as discussed with respect to FIGS. 1-15. The computing device 1010 may also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' may each be a single core processor or multiple core (1014 and 1014') processor.

Virtualization may be employed in the computing device 1010 so that infrastructure and resources in the computing device may be shared dynamically. A virtual machine 1024 may be provided to handle a process running on multiple processors so that the process appears to be using only one computing resource rather than multiple computing resources. Multiple virtual machines may also be used with one processor.

Memory 1016 may include a computational device memory or random access memory, such as but not limited to DRAM, SRAM, EDO RAM, and the like. Memory 1016 may include other types of memory as well, or combinations thereof.

A user may interact with the computing device 1010 through a visual display device 1001, 111A-D, such as a computer monitor, which may display one or more user interfaces 1002 that may be provided in accordance with exemplary embodiments. The computing device 1010 may include other I/O devices for receiving input from a user, for example, a keyboard or any suitable multi-point touch interface 1018, a pointing device 1020 (e.g., a mouse). The keyboard 1018 and the pointing device 1020 may be coupled to the visual display device 1001. The computing device 1010 may include other suitable conventional I/O peripherals.

The computing device 1010 may also include one or more storage devices 1034, such as but not limited to a hard-drive, CD-ROM, or other computer readable media, for storing data and computer-readable instructions and/or software that perform operations disclosed herein. Exemplary storage device 1034 may also store one or more databases for storing any suitable information required to implement exemplary embodiments. The databases may be updated manually or automatically at any suitable time to add, delete, and/or update one or more items in the databases.

The computing device 1010 may include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 may include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 may be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 may run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, iOS or any embedded operating system, any real-time operating system, any open source operating system, any proprietary operating system, or any other operating system capable of running on the computing device and performing the operations described herein. In exemplary embodiments, the operating system 1026 may be run in native mode or emulated mode. In an exemplary embodiment, the operating system 1026 may be run on one or more cloud machine instances.

Figure 12:
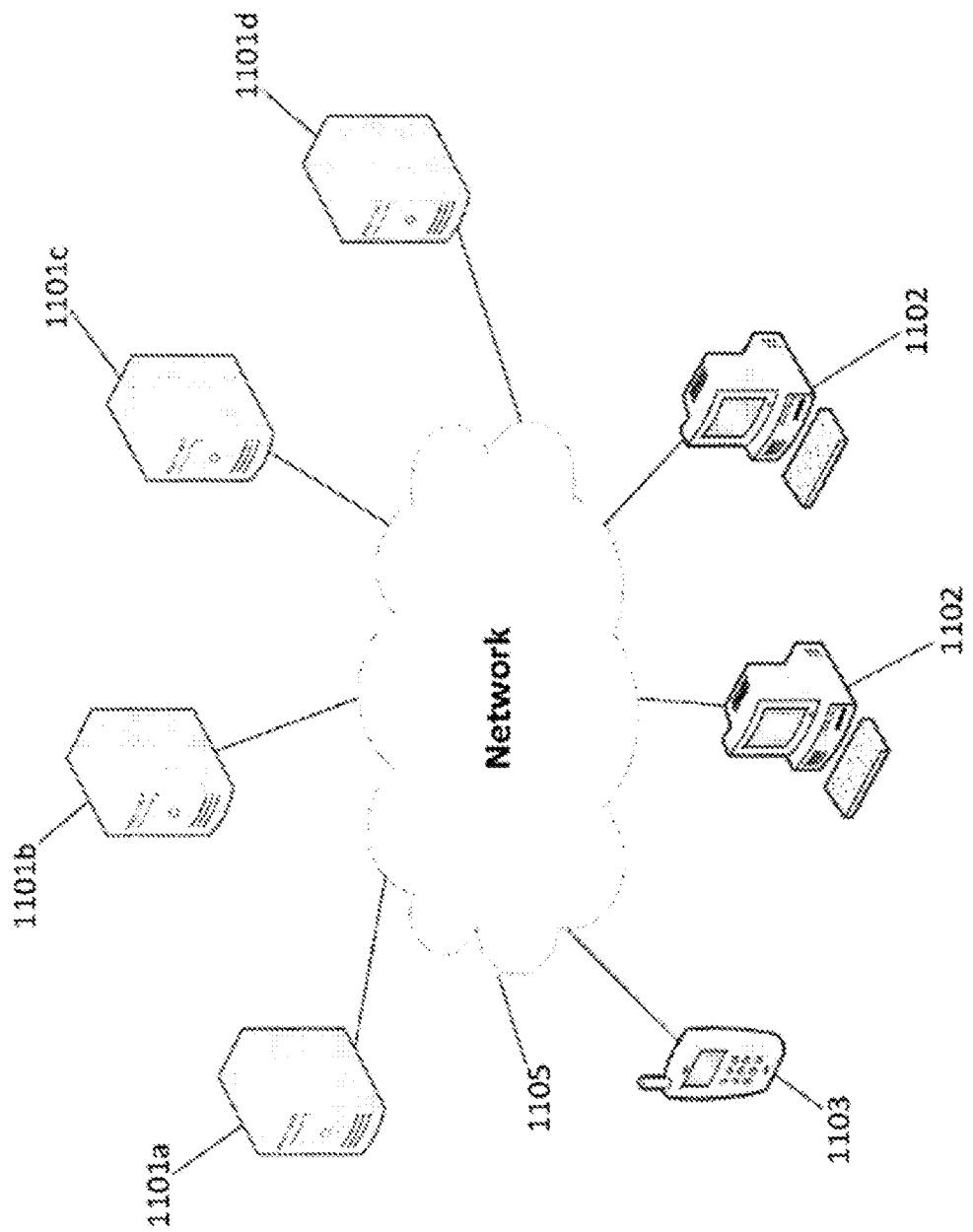
FIG. 12 is a network diagram of an exemplary distributed network.

FIG. 12 is an example computational device block diagram of certain distributed embodiments. Although FIGS. 1-11, and portions of the exemplary discussion above, make reference to a warehouse management system 15 or an order-server 14 each operating on an individual or common computing device, one will recognize that either of the warehouse management system 15 or the order-server 14 may instead be distributed across a network 1105 in separate server systems 1101*a*-*d* and possibly in user systems, such as kiosk, desktop computer device 1102, or mobile computer device 1103. For example, the order-server 14 and/or the zone server may be distributed amongst the tablets 48 of the robots 18. In some distributed systems, modules of any one or more of the warehouse management system software, the order-server software, and the zone engine may be separately located on server systems 1101*a*-*d* and may be in communication with one another across the network 1105.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

We claim:

1. A method for executing an order assigned to a first robot of a plurality of robots operating in a warehouse, wherein the plurality of robots interact with a warehouse management system to execute orders with the assistance of a plurality of operators, each order including a plurality of items and each item being located in the warehouse, the method comprising:

navigating the first robot to a first location in the warehouse proximate a storage location of a first item of the plurality of items in the order;

pausing at the first location for an operator of the plurality of operators to assist the first robot execute a function with respect to the first item;

determining if the first robot has been paused at the first location for greater than a maximum dwell time without being assisted by an operator;

if the first robot has been paused at the first location for greater than the maximum dwell time, causing the first robot to leave the first location without completing the function with respect to the first item and causing the first robot to proceed to a second location in the warehouse proximate a storage location of a second item of the plurality of items in the order to execute a function with respect to the second item.

2. The method of claim 1 wherein the function includes one of a pick, place or maintenance function.

3. The method of claim 1 wherein the step of causing includes assessing one or more of robot, operator, or active location population proximate each item in the order.

4. The method of claim 3 wherein the step of assessing robot, operator, or active location population includes determining one or more of the number of robots, operators, or active locations in a region about each item in the order.

5. The method of claim 4 wherein the step of assessing robot, operator, or active location population includes determining an operator to robot ratio in the region about each item in the order.

6. The method of claim 5 wherein the step of causing includes selecting the second item as the item having a region with one or more of the highest robot, operator, or active location population or operator to robot ratio in the region about each item in the order.

7. The method of claim 1 further including pausing the first robot at the second location for an operator of the plurality of operators to assist the first robot execute a function with respect to the second item.

8. The method of claim 7 wherein subsequent to the first robot executing a function at the second location with respect to the second item, the first robot returns to the first location in the warehouse proximate the storage location of a first item of the plurality of items in the order to execute a function at the first location with respect to the first item.

9. The method of claim 8 wherein the first robot, prior to returning to the first location, navigates to at least one additional location to execute a function with respect to an additional item in the order.

10. A system for executing orders each order including a plurality of items being located in a warehouse, the system comprising:

a plurality of robots operating in the warehouse, including a first robot to which an order is assigned;

a warehouse management system configured to interact with the plurality of robots to execute orders with the assistance of a plurality of operators;

a first robot of the plurality of robots configured to receive from the warehouse management system a first order having a plurality of items and to navigate to a first location in the warehouse proximate a storage location of a first item of the plurality of items in the order;

wherein the first robot is configured to determine if it has been paused at the first location for greater than a maximum dwell time without being assisted by an operator to execute a function with respect to the first item; and wherein, if the first robot has been paused at the first location for greater than the maximum dwell time, the first robot is configured to leave the first location without completing the function with respect to the first item and to interact with the warehouse management system to identify a second item of the plurality of items in the order; and wherein the first robot is configured to proceed to a second location in the warehouse proximate a storage location of the second item in the order to execute a function with respect to the second item with the assistance of an operator.

11. The system of claim 10 wherein the function includes one of a pick, place or maintenance function.

12. The system of claim 10 wherein in identifying a second item of the plurality of items in the order, the warehouse management is configured to assess one or more of robot, operator, or active location population proximate each item in the order.

13. The system of claim 12 wherein in assessing the robot, operator, or active location population, the warehouse management system is configured to determine one or more of the number of robots, operators, or active locations in a region about each item in the order.

14. The system of claim 13 wherein in assessing one or more of robot, operator, or active location population, the warehouse management system is configured to determine an operator to robot ratio in the region about each item in the order.

15. The system of claim 14 wherein in identifying the second item of the plurality of items in the order, the warehouse management system is configured to select the second item as the item having a region with one or more of the highest robot, operator, or active location population or operator to robot ratio in the region about each item in the order.

16. The system of claim 10 wherein the first robot is configured to pause at the second location for an operator of the plurality of operators to assist the first robot execute a function with respect to the second item.

17. The system of claim 16 wherein subsequent to the first robot executing a function at the second location with respect to the second item, the first robot is configured to return to the first location in the warehouse proximate the storage location of a first item of the plurality of items in the order to execute a function at the first location with respect to the first item.

18. The system of claim 17 wherein the first robot, prior to returning to the first location, is configured to navigate to at least one additional location to execute a function with respect to an additional item in the order.

* * * * *